US010293863B2

(12) United States Patent
Hall et al.

(10) Patent No.: US 10,293,863 B2
(45) Date of Patent: May 21, 2019

(54) VEHICLE BODY PANEL SECURING STRUCTURE

(71) Applicants: David R. Hall, Provo, UT (US); Stephen R. Hall, Draper, UT (US); Christopher Johnson, Provo, UT (US); Jason Simpson, Provo, UT (US); Jedediah Knight, Provo, UT (US)

(72) Inventors: David R. Hall, Provo, UT (US); Stephen R. Hall, Draper, UT (US); Christopher Johnson, Provo, UT (US); Jason Simpson, Provo, UT (US); Jedediah Knight, Provo, UT (US)

(73) Assignee: Hall Labs LLC, Provo, UT (US)

( * ) Notice: Subject to any disclaimer, the term of this patent is extended or adjusted under 35 U.S.C. 154(b) by 5 days.

(21) Appl. No.: 15/432,304

(22) Filed: Feb. 14, 2017

(65) Prior Publication Data

US 2018/0229774 A1 Aug. 16, 2018

(51) Int. Cl.
| | |
|---|---|
| *B62D 25/08* | (2006.01) |
| *B62D 29/00* | (2006.01) |
| *B62D 29/04* | (2006.01) |
| *B62D 27/06* | (2006.01) |
| *B62D 25/12* | (2006.01) |
| *B62D 61/06* | (2006.01) |
| *B62D 25/10* | (2006.01) |

(52) U.S. Cl.
CPC .......... *B62D 25/081* (2013.01); *B62D 25/12* (2013.01); *B62D 27/06* (2013.01); *B62D 61/065* (2013.01); *B62D 25/10* (2013.01); *B62D 29/008* (2013.01); *B62D 29/043* (2013.01)

(58) Field of Classification Search
CPC .. B62D 25/081; B62D 29/001; B62D 29/007; B62D 29/008; B62D 29/043; B62D 27/06
USPC ......................................... 296/192
See application file for complete search history.

(56) References Cited

U.S. PATENT DOCUMENTS

| | | | | |
|---|---|---|---|---|
| 4,453,763 A | * | 6/1984 | Richards | ............. B62D 29/001 180/215 |
| 2008/0169680 A1 | * | 7/2008 | Hedderly | ............. B62D 27/023 296/193.01 |

* cited by examiner

*Primary Examiner* — Joseph D. Pape
*Assistant Examiner* — Dany D Ivey

(57) ABSTRACT

A three-wheeled automobile is described herein. The automobile may include a unibody frame, a flexible engine cowling, and a fastener. The unibody frame may include an exposed unibody panel and/or a removable-panel securing fixture disposed adjacent to the exposed unibody panel. The engine cowling may be secured to the securing fixture. The fastener may pass through the engine cowling panel and may be affixed to the securing fixture, thereby securing the engine cowling panel to the unibody frame. The engine cowling panel may pass over the securing fixture and/or behind the unibody panel. The engine cowling panel may be pressed against the unibody panel outwards from the automobile by a bending force in the engine cowling panel such that the exposed unibody panel may prevent bowing of an outside edge of the engine cowling panel directly adjacent to the unibody panel.

20 Claims, 16 Drawing Sheets

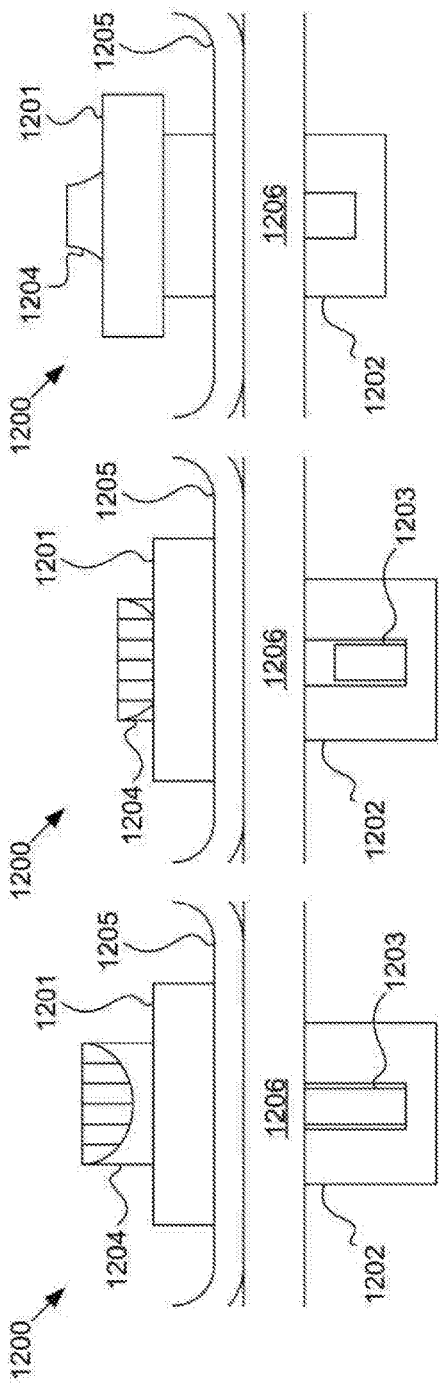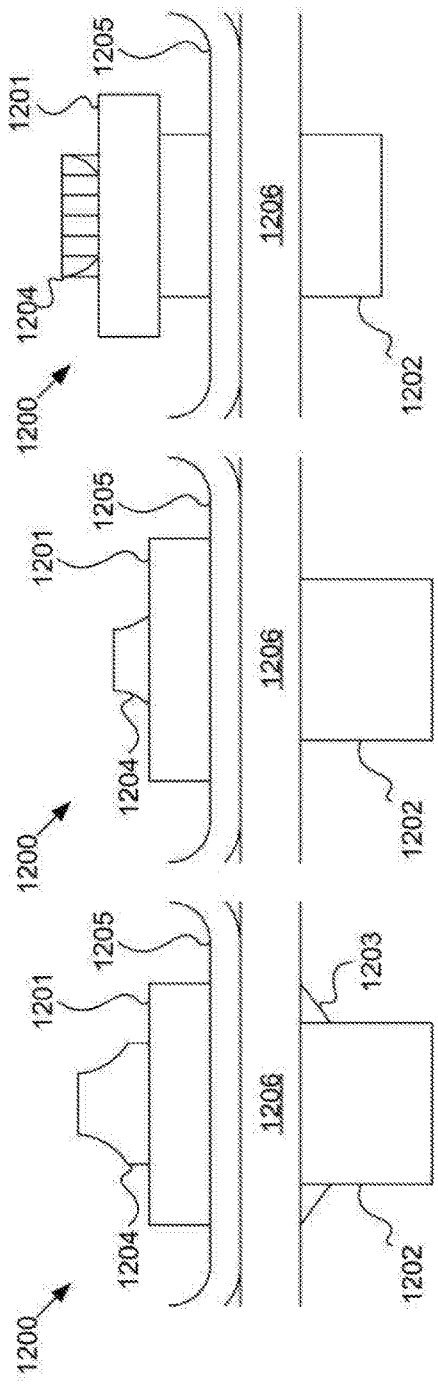

VEHICLE BODY PANEL SECURING STRUCTURE

TECHNICAL FIELD

This invention relates generally to the field of vehicles, and more specifically to automobiles with body panels.

BACKGROUND

The popularity of three-wheeled roadsters has grown dramatically in recent years. As consumers become more sophisticated in purchasing such vehicles, great pressure has been placed on manufacturers to increase performance and affordability simultaneously, all while retaining and improving upon the highest standards of design and appearance. One solution has been to use a space frame with plastic body panels to decrease vehicle weight. However, the decreased weight comes at a cost; the design loses a sense of exoticness and luxuriousness. Thus, there is still room for improvements that retain sleek design features while still improving on performance and price.

SUMMARY OF THE INVENTION

As a specific example of general vehicle embodiments described herein, a three-wheeled automobile is described herein that incorporates some solutions to the problems discussed above in the Background. The automobile may include a unibody frame, a flexible engine cowling, and a fastener. The unibody frame may include an exposed unibody panel and/or a removable-panel securing fixture disposed adjacent to the exposed unibody panel. The engine cowling may be secured to the securing fixture. The fastener may pass through the engine cowling panel and may be affixed to the securing fixture, thereby securing the engine cowling panel to the unibody frame. The engine cowling panel may pass over the securing fixture and/or behind the unibody panel. The engine cowling panel may be pressed against the unibody panel outwards from the automobile by a bending force in the engine cowling panel such that the exposed unibody panel may prevent bowing of an outside edge of the engine cowling panel directly adjacent to the unibody panel.

The vehicle briefly summarized above may address some of the problems described in the Background in many ways. For example, the placement of the flexible engine cowling and the unibody panel may allow for the use of flexible, light-weight materials. Such materials may have the tendency to bow, which may diminish the quality of the vehicle's design. However, the positioning with respect to the unibody panel may prevent bowing. This may allow the vehicle to retain sharp lines while still reducing the vehicle's weight. The use of unibody panels and inexpensive materials for the engine cowling panel may also decrease manufacturing costs.

BRIEF DESCRIPTION OF THE DRAWINGS

A more particular description of the vehicles summarized above is made below by reference to specific embodiments. Several embodiments are depicted in drawings included with this application, in which:

FIGS. 12A-F depict various side views of one embodiment of a fastener; and

DETAILED DESCRIPTION

Figure 1A:
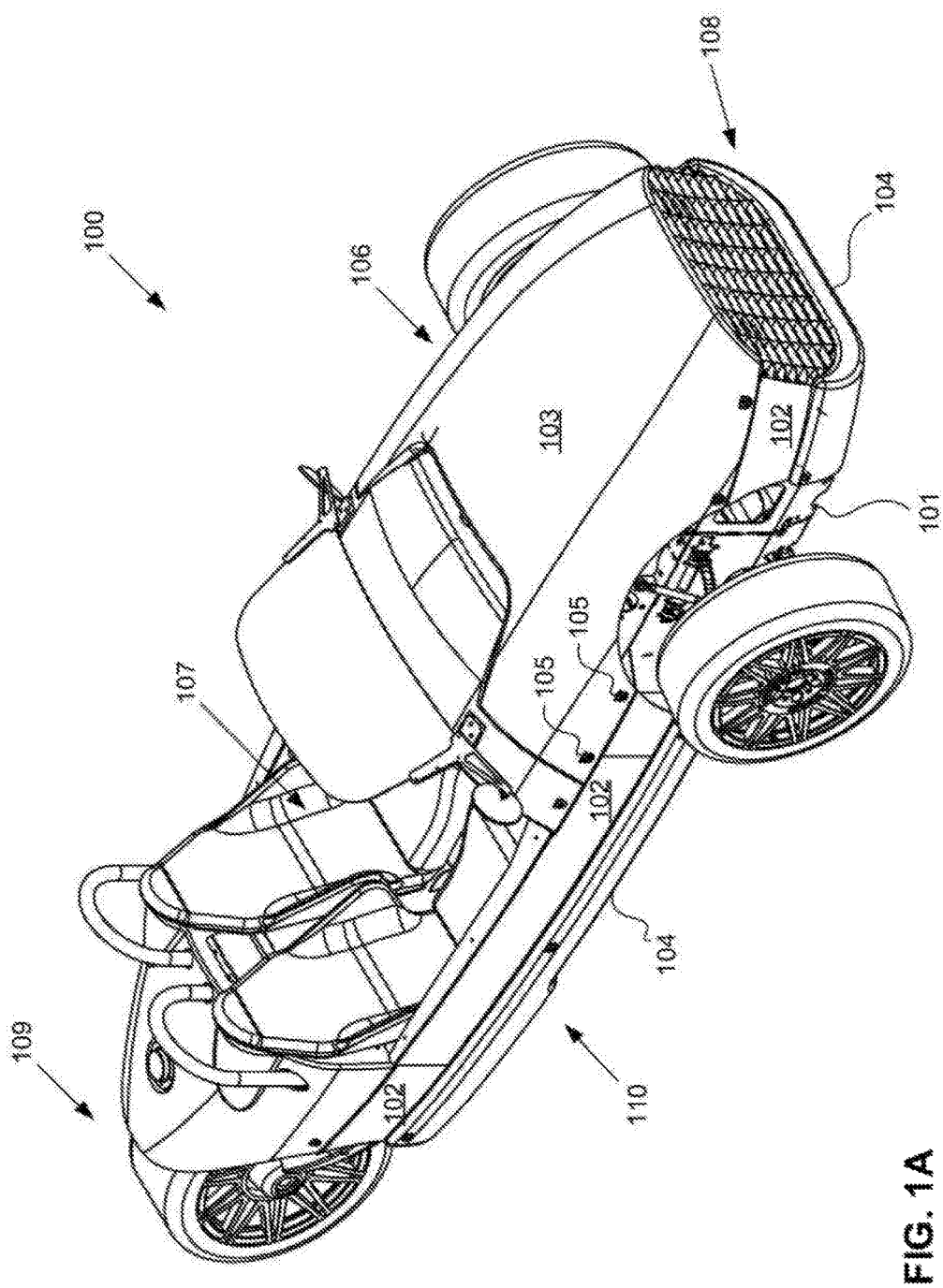
FIGS. 1A-B depict two views of a three-wheeled automobile in accordance with the vehicles described in the Summary and Detailed Description.

Embodiments of vehicles incorporating various features are described herein. Although the FIGs. described below generally depict a three-wheeled automobile, the attendant features are also envisioned for incorporation into any of a variety of vehicles. As used herein, "vehicle" may refer, generally, to any of a variety of inanimate passenger or cargo carriers, including landcraft, watercraft, aircraft, and combinations thereof. Examples include automobiles, all-terrain vehicles, amphibious vehicles, buses, trucks, cars, rickshaws, bicycles, motorcycles, cable cars, sleds, golf carts, drones, handcars, hovercraft, land yachts, locomotives, maglevs, minibuses, minivans, monorails, monowheels, mopeds, omni directional vehicles, quadracycles, rocket sleds, rovers, sea tractors, ground effect vehicles, boats, ships, catamarans, canoes, hydrofoils, jet skis, kayaks, ferries, airplanes, helicopters, autogyros, balloons, gliders, ornithopters, pedalos, powered parachutes, and rockets, among others.

The vehicle may include any of a variety of mechanisms for travelling across and/or through surfaces, such as wheels, skis, skids, hulls, and airfoils. Similarly, the vehicle may include any of a variety of mechanisms for accessing the vehicle, such as doors, windows, hatches, and permanent openings. In various embodiments, the vehicle may include a frame on which various vehicle components are mounted. The vehicle may also, in some embodiments, include components such as body panels, an engine or motor, a transmission, an electrical system, one or more batteries, a heating and/or cooling system, navigational systems, and a fuel system, among others. Various vehicle components may be comprised of any of a variety of materials and material combinations, such as metal, plastic, rubber, leather, glass and composites.

The vehicle may include a frame, a removable body panel, and a fastener. The frame may include a removable-panel securing fixture. The removable body panel may be secured to the securing fixture. The fastener may pass through the removable body panel and may be affixed to the securing fixture, thereby securing the removable body panel to the frame. The removable body panel may pass over the securing fixture and/or behind a portion of the frame. An outside edge of the removable body panel may be pressed against the frame outwards from the vehicle by a bending force in the removable body panel such that the frame may prevent bowing of the outside edge. The outside edge may be directly adjacent to the frame.

The bending force may be a result of one or more of a variety of factors. Such factors may include manufacturing defects and/or overtightening of the removable body panel to the securing fixture. The bending force may result in bowing of the outside edge of the removable body panel, especially in embodiments where the body panel is comprised of a flexible plastic such as ABS plastic. The bending force may require up to 50 pounds of counter-force to prevent bowing, depending on the type and thickness of the material forming the removable body panel. The bending force may behave similar to an ideal spring, wherein the force exerted is proportional to a spring constant and the length of bowing past an ideal position. For example, the bending force may bow the outside edge of the removable body panel one inch away from the unibody panel. To prevent the bowing, the unibody panel may exert a counter force on the outside edge, keeping the outside edge aligned with the unibody panel. The counter force may be equal to one inch multiplied by the spring constant of the particular material forming the removable body panel. The amount of counter force may also vary depending on whether the spring force is radial, such as radiating from an overtightened fastener.

The frame may include any of a variety of base structures for the vehicle, including a ladder frame, a unibody frame, a backbone tube frame, an X-frame, a perimeter frame, a platform frame, a space frame, a subframe, or combinations thereof. The frame may be formed of any of a variety of materials, including aluminum, steel, carbon, other metal alloys, and/or combinations thereof. The frame may incorporate various rail designs, such as c-shape, hat, boxed, tubular, planar, and/or combinations thereof. For example, the frame element described above as preventing the removable body panel from bowing ("frame element") may include a frame rail and/or an exposed unibody panel. An exposed unibody panel may form at least a portion of an exterior body of the vehicle, such that no other body element covers the exposed unibody panel. Various elements of the frame may be cut, welded, extruded, or combinations thereof, to form the frame. The frame may include a layer of paint and/or powder coating, and/or may incorporate other protective layers.

The frame element may include a shape. The removable body panel may also include a shape. The frame element- and body panel-shapes may be complementary. The frame element shape may be formed by one or more frame rails and/or panels, may be formed in one or more frame rails and/or panels, or some combination thereof. Similarly, the removable body panel shape may be formed by the removable body panel, in the removable body panel, or some combination thereof. The frame element- and body panel-shapes may be disposed adjacent to each other. Additionally, the frame element- and body panel-shapes may be forced against each other by the bending force in the removable body panel. The frame element-shape may include a curve, a right angle, a hook, or a combination thereof. Similarly, the body panel-shape may include a curve, a right angle, a hook, or a combination thereof. The frame element curve may be complementary to the body panel curve; the frame element right angle may be complementary to the body panel right angle; and the frame element hook may be complementary to the body panel hook.

The frame element may include a slot formed by and/or in one or more frame rails and/or panels. The outside edge of the removable body panel may sit in the slot. Additionally or alternatively, the removable body panel may include an indentation corresponding to the frame element. The indentation may be disposed along the outside edge of the removable body panel, and may correspond to an edge formed in, or by, one or more frame rails and/or panels.

The frame element may be disposed around the frame in any of a variety of positions. The frame element may extend across a front of the vehicle, along a side of the vehicle, across a back end of the vehicle, across a top side of the vehicle, along an underbody of the vehicle, or a combination thereof. The vehicle may include various compartments, such as an engine compartment, a passenger compartment, a luggage compartment, or a combination thereof. The frame element may be disposed along and/or between such compartments. For example, the frame element may extend across a top side of the vehicle between the passenger compartment and the engine compartment. The frame element may form all or a portion of a covering for the vehicle compartment, either alone or in conjunction with the removable body panel. For example, the frame element and the removable body panel may form an engine cowling surrounding the engine compartment.

The frame element may include segmented portions. For example, the vehicle may include a wheel well, and the frame element may extend from two or more sides of the wheel well. In such a manner, the frame element may be segmented by the wheel well. In another example, the frame element may form a portion of the wheel well. The removable body panel may form a portion the wheel well, either in conjunction with the frame element, or separately.

The removable-panel securing fixture may be disposed adjacent to the frame element, thereby enabling alignment of the removable body panel with the frame element, and fixture of the removable body panel to the frame. Accordingly, the removable body panel may include a shape formed in, or by, the removable body panel that is complementary to a shape of the securing fixture. The securing fixture may include an opening through which the fastener passes to secure the removable body panel to the frame. The opening may be threaded, or the opening may be smooth. The securing fixture may include a standoff extended from the frame to meet the removable body panel. Although the securing fixture is referred to singularly, the vehicle may include, in various embodiments, one or more securing fixtures, at least one of which may be embodied as described herein.

The removable body panel may be comprised of any of a variety of materials, including aluminum, steel, fiberglass, carbon fiber, and/or plastic. For example, the removable body panel may include a thermoplastic such as ABS, nylon, PLA, polycarbonate, polybenzimidazole, polyether sulfone, polyetherether ketone, polyetherimide, polyethylene, polyphenylene oxide, polyphenylene sulfide, polypropylene, polystyrene, PVC, PTFE, or combinations thereof. The removable body panel may be flexible. This may allow for a wider range of manufacturing tolerances and/or defects in the removable body panel, which, in turn, may reduce the cost of manufacturing through fewer junked parts. Additionally, the removable body panel may form any of a variety of portions of the vehicle's exterior, including a fender, a door panel, a luggage trunk, an engine cowling, a roof, an underbody, a sidewall or combinations thereof. Additional removable body panels may be included. For example, a flexible body panel may be disposed along a side of the frame element opposite a flexible engine cowling panel.

The fastener may include a variety of structures that attach the removable body panel to the frame via the securing fixture. Alternatively, the fastener may attach the removable body panel directly to the frame. The fastener may include, for example, a rod, a head, and a spring-loaded detent. The rod and detent may pass through the removable body panel and the opening in the securing fixture. The detent may press against a back side of the securing fixture and pin the removable body panel between the securing fixture and the fastener head. Additionally, the detent may retract into the fastener rod and rotate within the rod to prevent the detent from engaging the securing fixture. Additionally or alternatively, the securing fixture may include a threaded opening, and the rod may include threading corresponding to the threaded opening. Both the detent solution and the threaded rod solution may allow a user to remove the fastener from the openings in the securing fixture and the removable body panel, and to remove the body panel from the vehicle. Although the fastener is referred to singularly, the vehicle may include, in various embodiments, one or more fasteners, at least one of which may be embodied as described herein.

The FIGs. described below depict specific embodiments of the vehicles generally described above in the Summary and Detailed Description. Reference is made to specific features described above for example only, and not for limitation. Those of skill in the art recognize variations of those specific features and the features depicted in the FIGs. that fall within the description of the vehicles described above but are not expressly shown or recited.

Figure 1B:
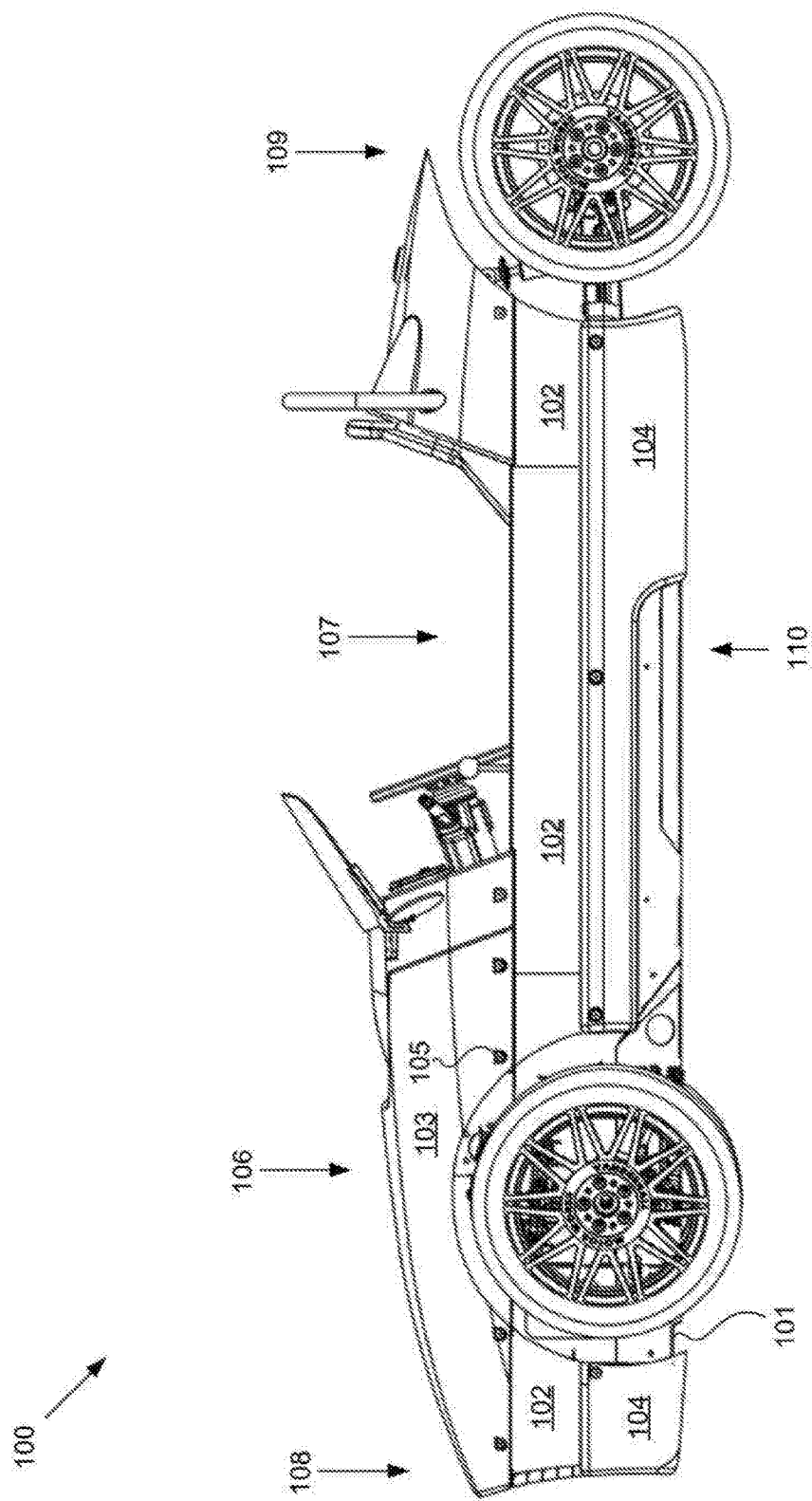

FIGS. 1A-B depict two views of a three-wheeled automobile in accordance with the vehicles described above in the Summary and Detailed Description. FIG. 1A is a top-front isometric view and FIG. 1B is a side view. The automobile 100 includes a unibody frame 101, an exposed unibody panel 102, a flexible engine cowling panel 103, a flexible body panel 104 fasteners 105, an engine compartment 106, a passenger compartment 107, a front end 108, a back end 109, and sides 110. The engine cowling panel is removable by removing the fasteners. The fasteners are affixed to securing fixtures under the engine cowling panel. The unibody panel and the engine cowling panel form an engine cowling surrounding the engine compartment. The unibody panel also forms a sidewall of the passenger compartment extending along the sides of the automobile from the front end to the back end. In the present embodiment, the passenger compartment is doorless, and passengers access the passenger compartment by stepping over the sidewalls. The engine cowling panel extends across the vehicle forming a top surface of the vehicle. The flexible body panel forms a bottom portion of the sidewall beneath the unibody panel, and a portion of the underbody at the front end of the automobile.

Figure 2:
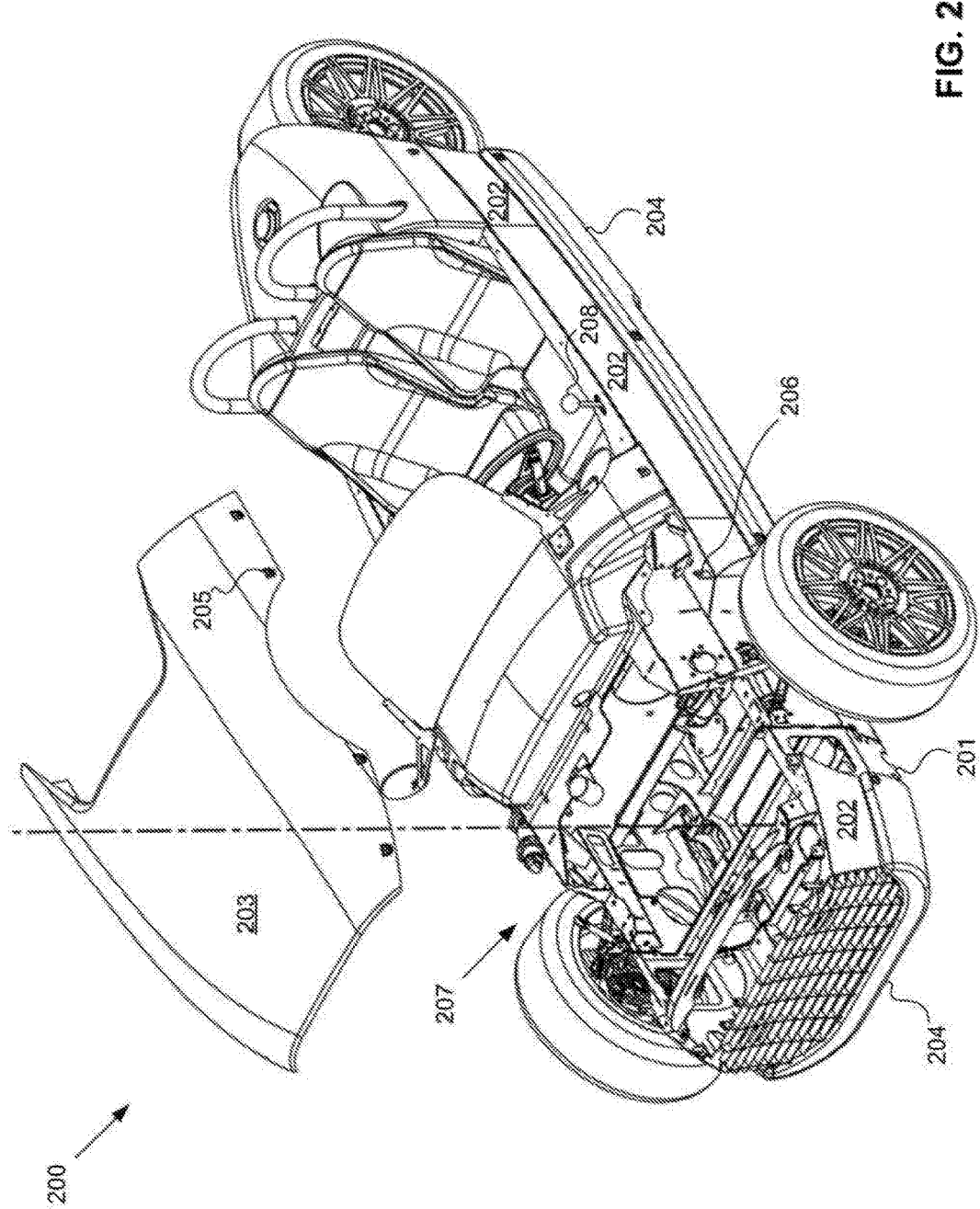
FIG. 2 depicts a three-wheeled automobile with a portion of the engine cowling removed to show the engine compartment.

FIG. 2 depicts a three-wheeled automobile with a portion of the engine cowling removed to show the engine compartment. The automobile 200 includes a unibody frame 201, an exposed unibody panel 202, a flexible engine cowling panel 203, a flexible body panel 204, fasteners 205, removable-panel securing fixtures 206, and an engine compartment 207. Some components of the automobile, such as the engine and suspension, are not shown to more clearly show details of the frame. Additionally shown is a shifter 208 extending from a sidewall formed by the frame.

Figure 3A:
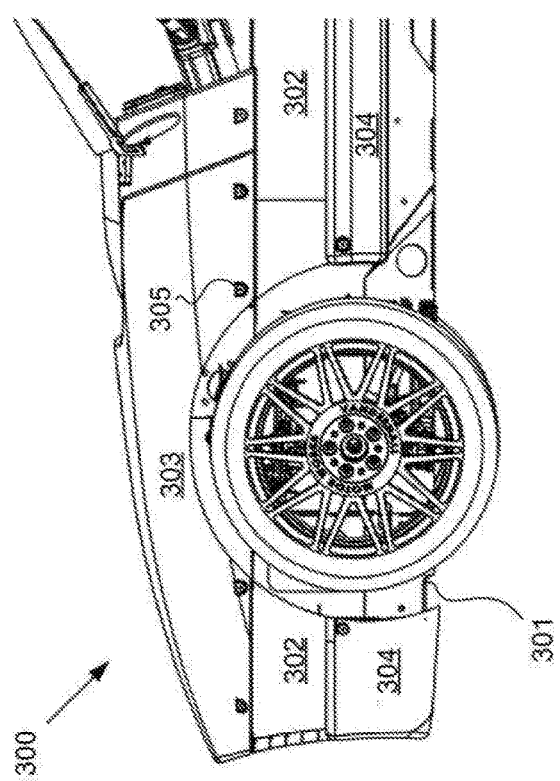
FIGS. 3A-B depict two partial side views of a three-wheeled automobile.
Figure 3B:
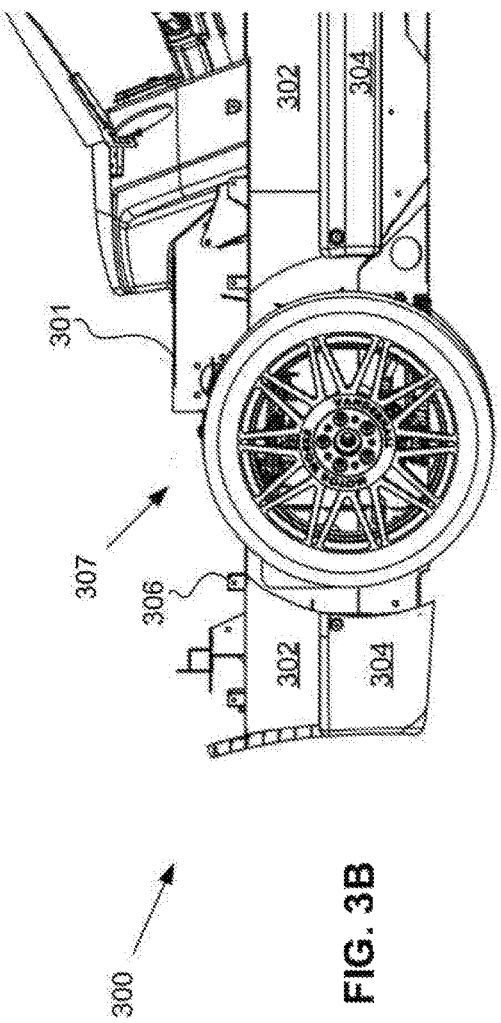

FIGS. 3A-B depict two partial side views of a three-wheeled automobile. The automobile 300 includes a unibody frame 301, an exposed unibody panel 302, a flexible engine cowling panel 303, a flexible body panel 304, fasteners 305, removable-panel securing fixtures 306, and engine compartment 307. In FIG. 3B, the engine cowling panel is removed to show the securing fixtures.

Figure 4:
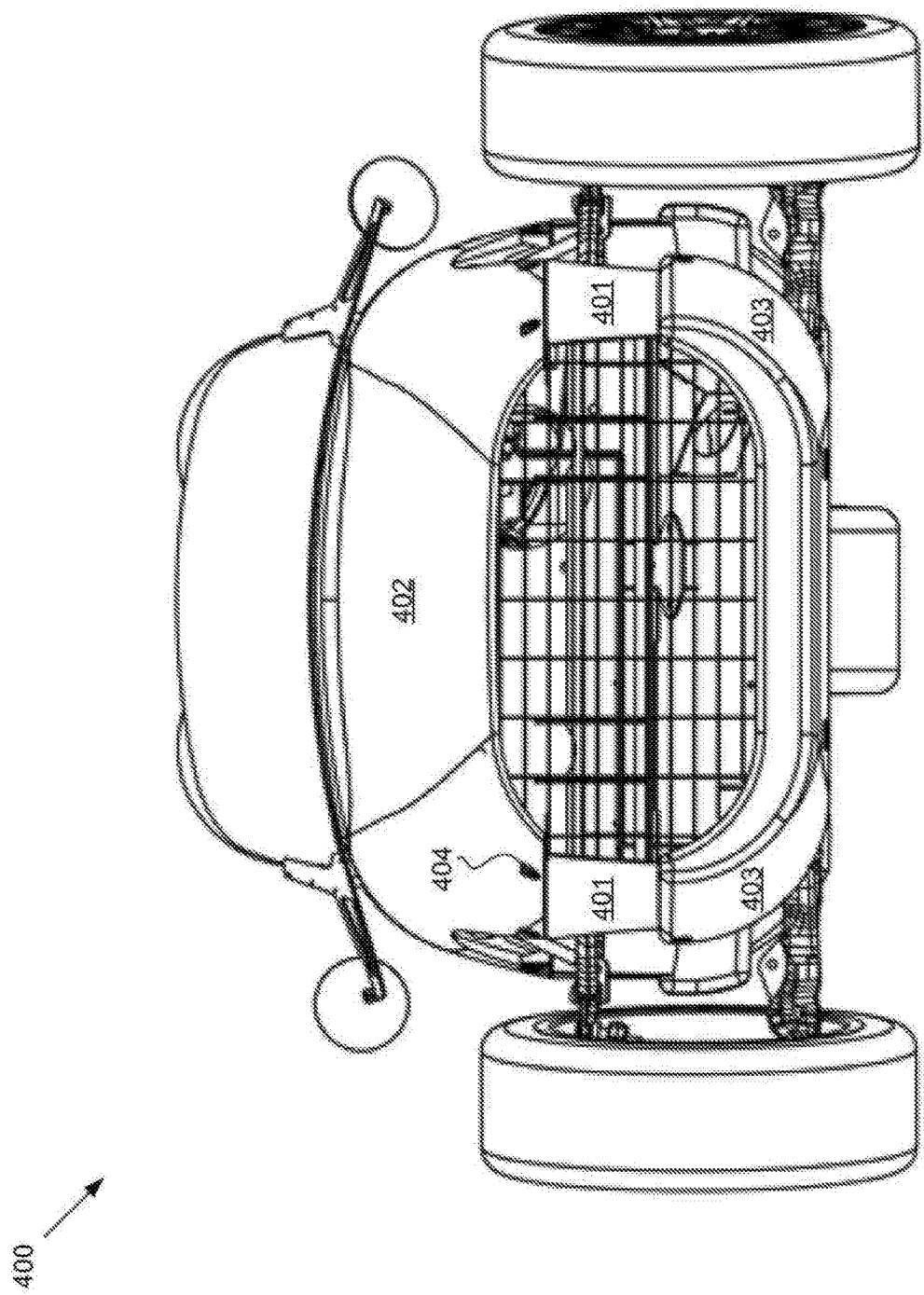
FIG. 4 depicts a front view of a three-wheeled automobile.

FIG. 4 depicts a front view of a three-wheeled automobile. The automobile 400 includes an exposed unibody panel 401, a flexible engine cowling panel 402, a flexible body panel 403, and fasteners 404.

Figure 5:
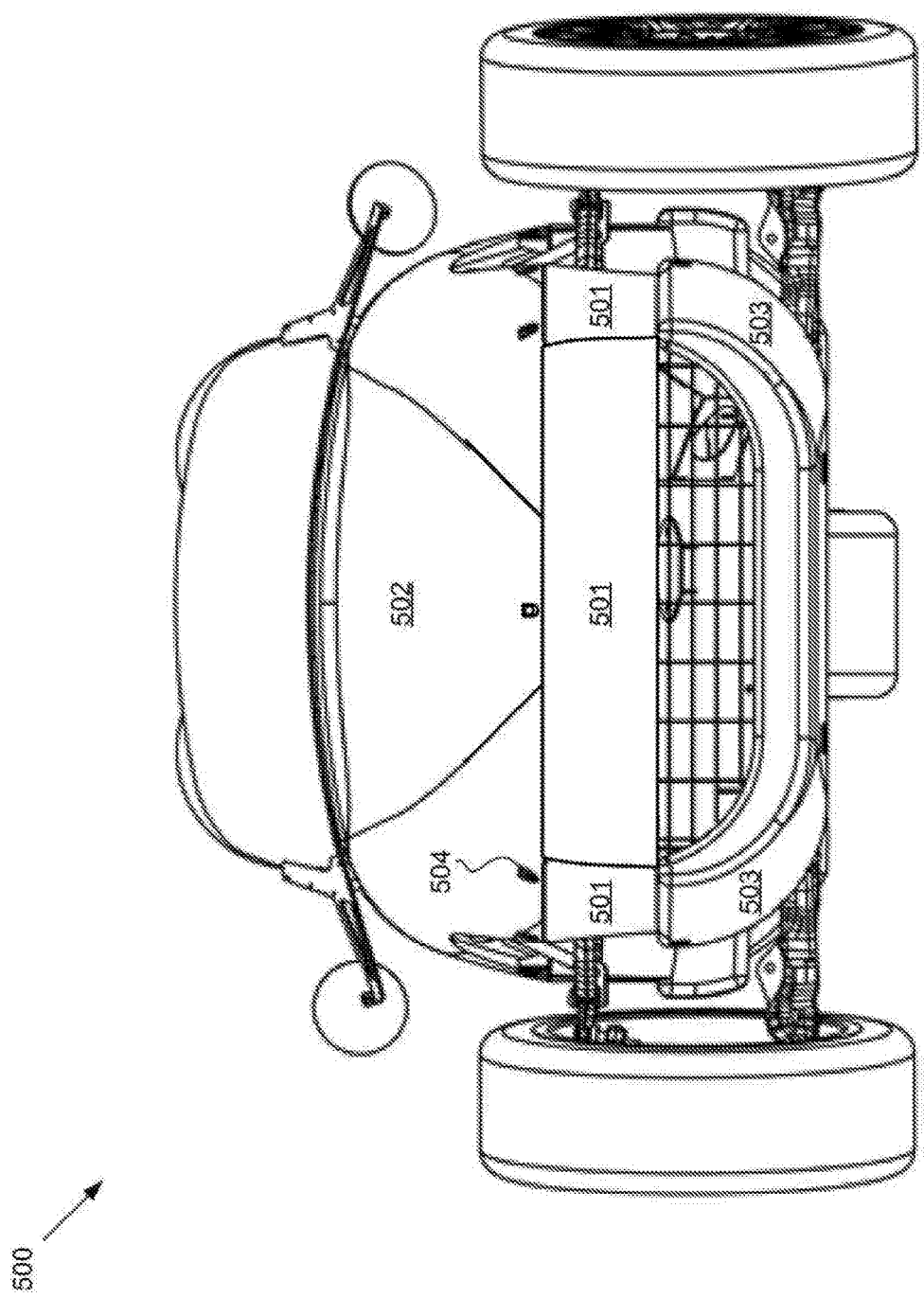
FIG. 5 depicts a second front view of a three-wheeled automobile with an alternative frame design.

FIG. 5 depicts a second front view of a three-wheeled automobile with an alternative frame design. The automobile 500 includes an exposed unibody panel 501, a flexible engine cowling panel 502, a flexible body panel 503, and fasteners 504. As opposed to that depicted in FIG. 4, the unibody panel extends across the front end of the vehicle. The front-end portion of the unibody panel may be incorporated with portions extending along the sides of the vehicle. Alternatively, the front-end portion may form a front-end crumple zone that protects the frame from damage during a front-end impact. The front-end crumple zone may be formed by tab members wedged into slot members in the frame.

Figure 6:
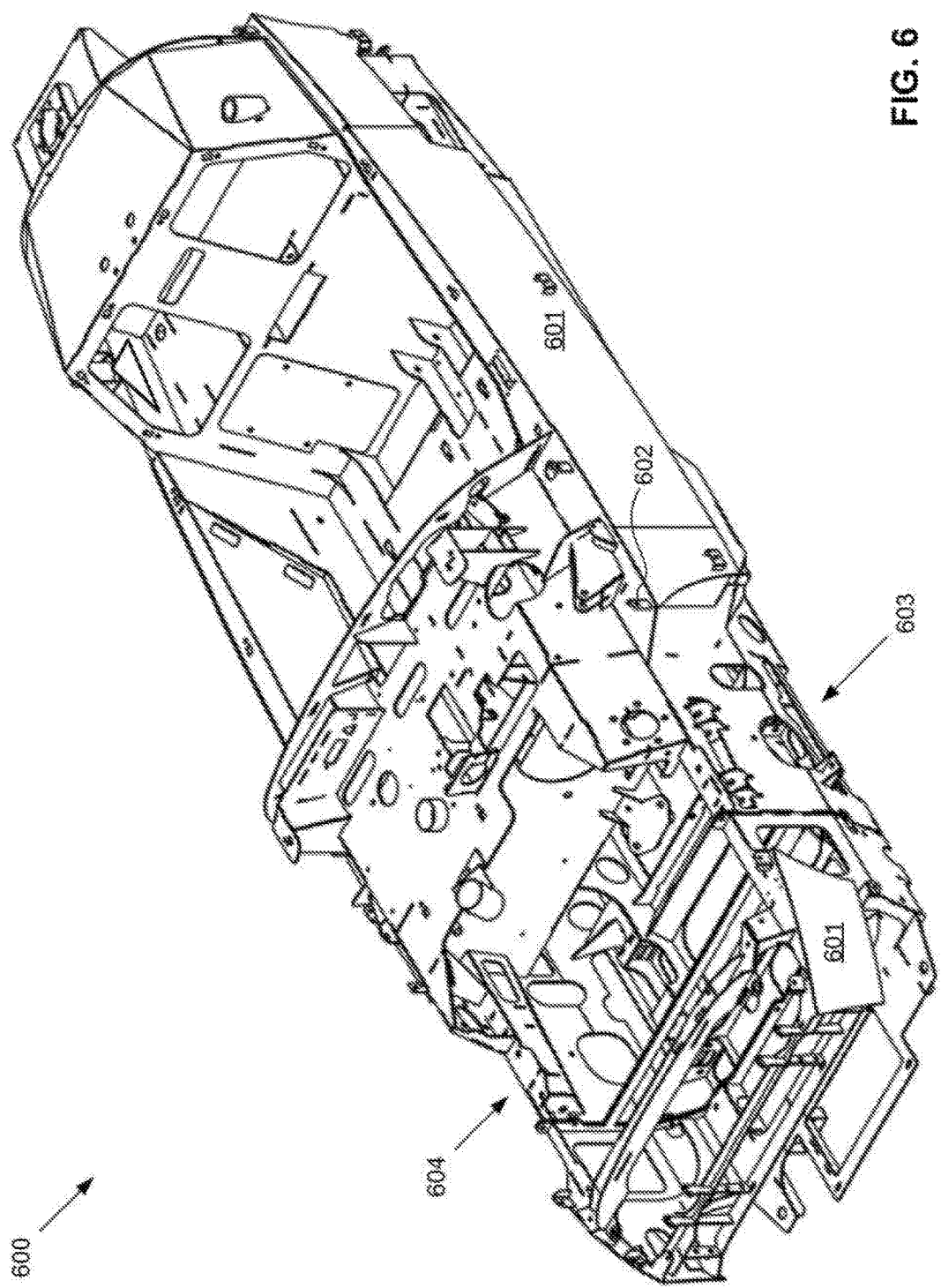
FIG. 6 depicts a front isometric view of a three-wheeled automobile frame.

FIG. 6 depicts a front isometric view of a three-wheeled automobile frame. The automobile 600 includes an exposed unibody panel 601, removable-panel securing fixtures 602, wheel well 603, and engine compartment 604. The unibody panel is segmented by the wheel well. An engine cowling panel (not shown) covers the engine compartment and forms part of the wheel well.

Figure 7:
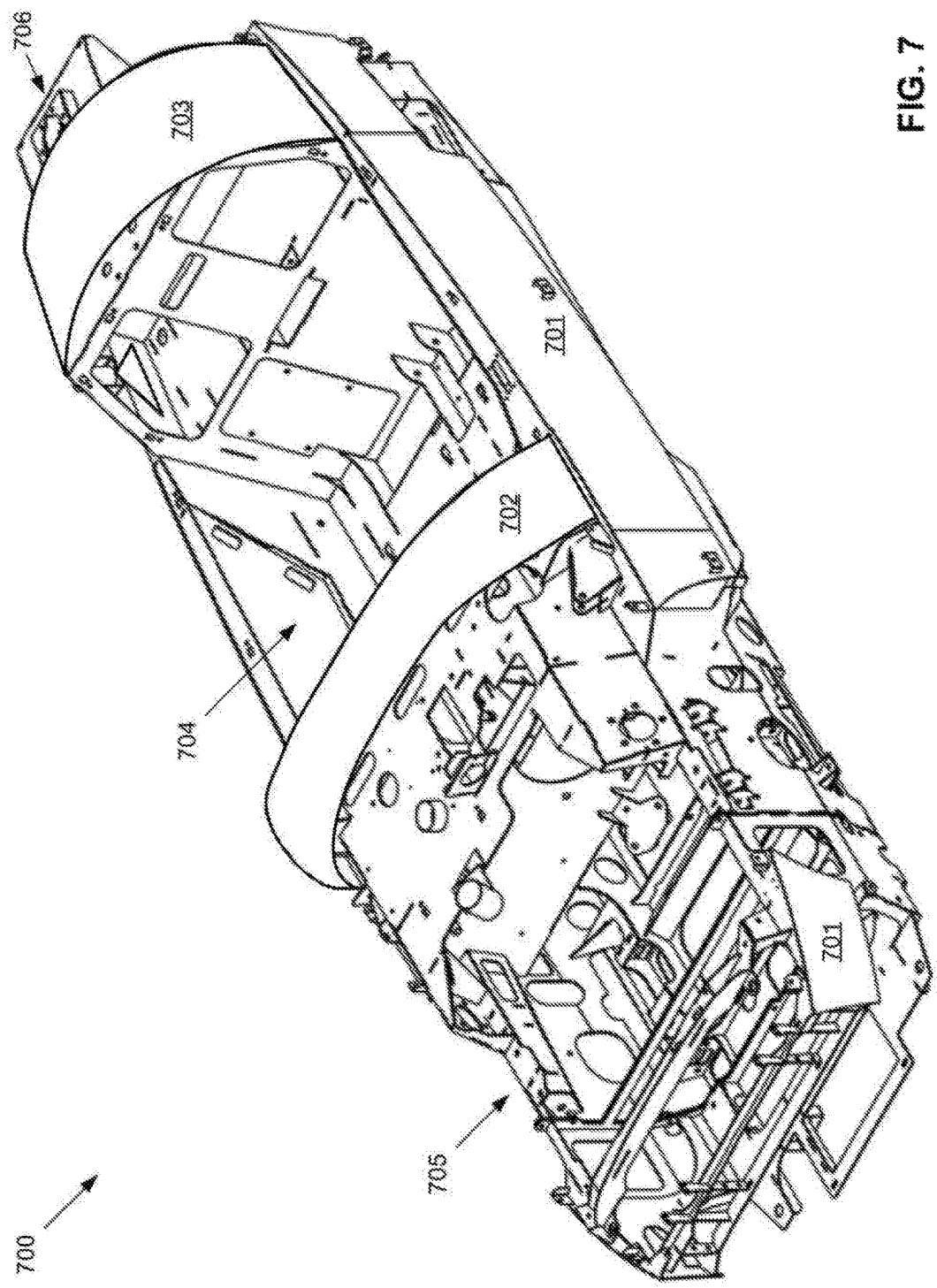
FIG. 7 depicts a front isometric view of a three-wheeled automobile frame, including additional unibody panels.

FIG. 7 depicts a front isometric view of a three-wheeled automobile frame, including additional unibody panels. The automobile 700 includes a side unibody panel 701, a forward unibody panel 702, a rear unibody panel 703, a passenger compartment 704, an engine compartment 705, and a fuel intake 706. The forward panel is disposed between the passenger compartment and engine compartment. A flexible engine cowling panel may slide at least partially under the forward unibody panel and be affixed to the frame by fasteners and securing fixtures such as those described above and below with regard to other figures. A flexible rear body panel and/or wheel cover may similarly slide at least partially under the rear unibody panel and be affixed to the frame by fasteners and securing fixtures.

Figure 8:
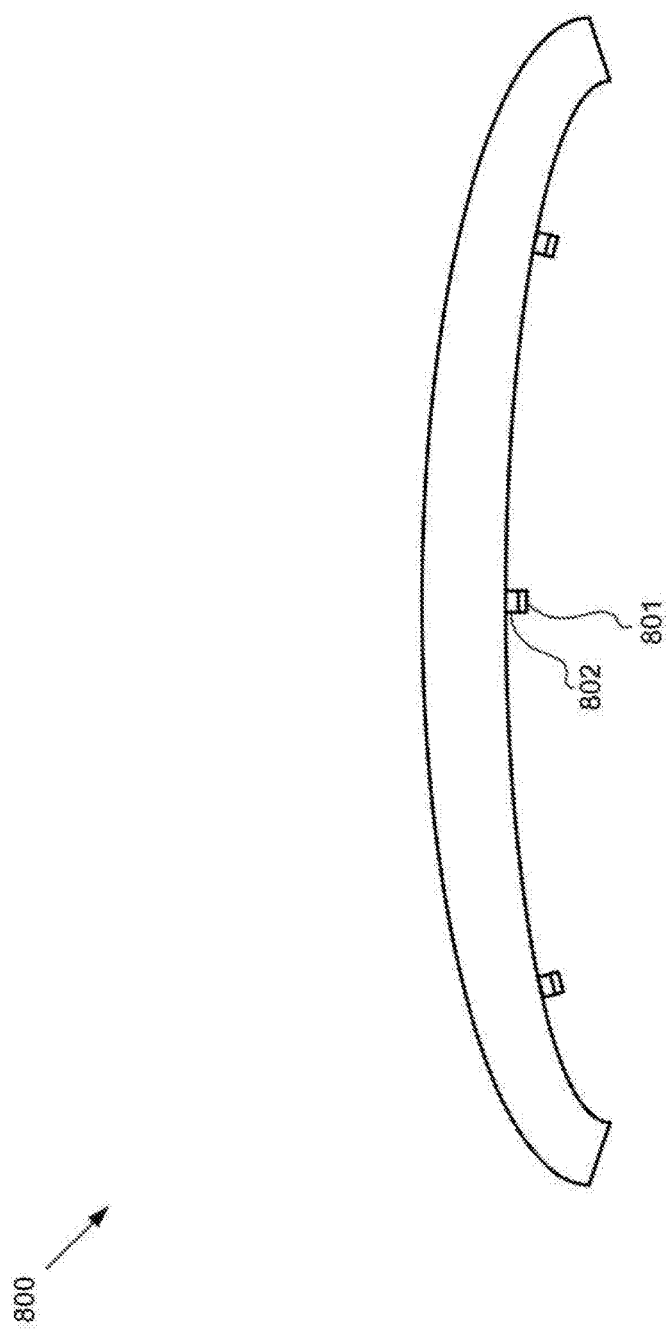
FIG. 8 depicts a front view of a forward unibody panel.

FIG. 8 depicts a front view of a forward unibody panel, such as one that may be disposed between a passenger compartment and an engine compartment. The unibody panel 800 includes removable-panel securing fixtures 801. The forward unibody panel extends across an automobile forming at least a portion of a top surface of the vehicle. The forward unibody panel may extend across the vehicle between a passenger and an engine compartment. A flexible body panel may fit between the unibody panel and the securing fixtures, such as at a point 802, and may be affixed to the securing fixtures, and thereby the unibody panel, by fasteners. The unibody panel may prevent bowing of the flexible body panel by the positioning of the flexible panel under the unibody panel between the unibody panel and the securing fixture.

Figures 9A, 9B:
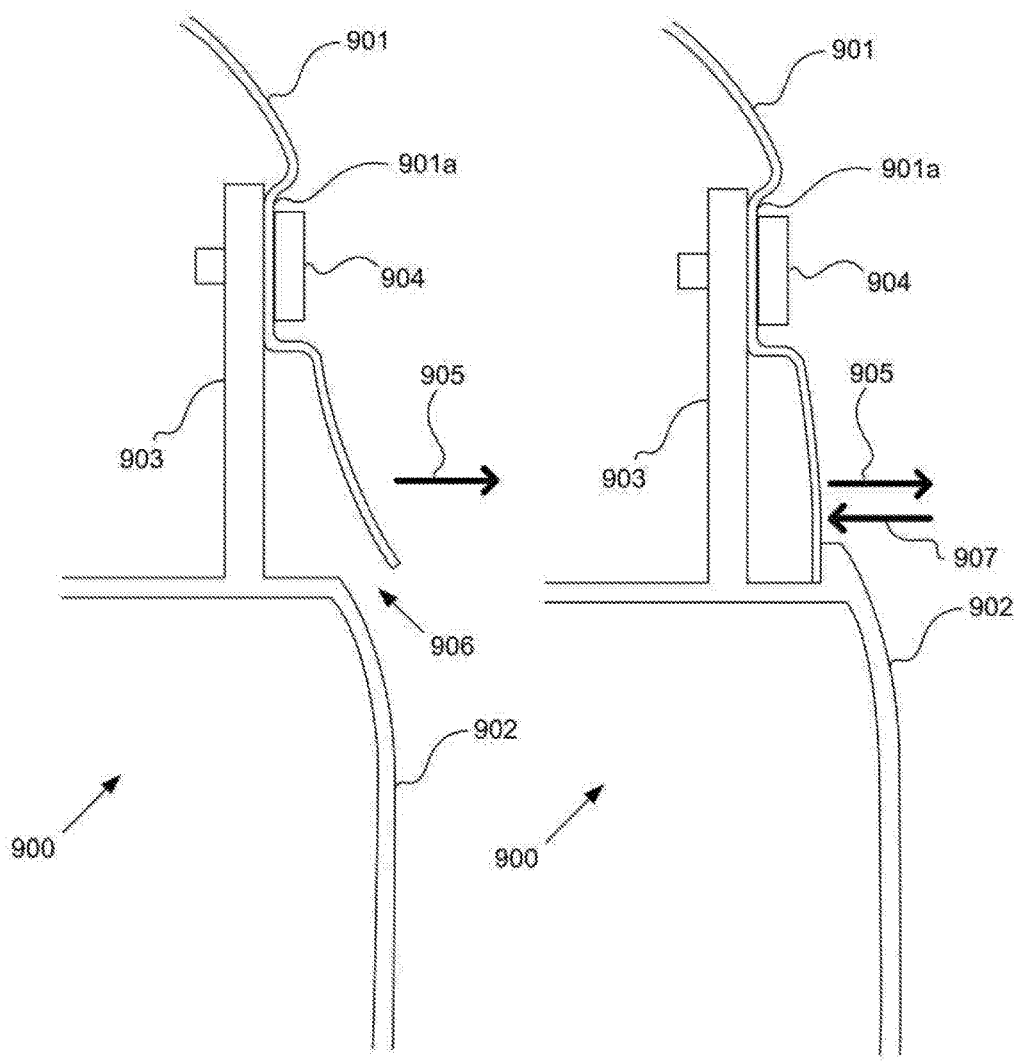
FIGS. 9A-B depict zoomed-in cross-sectional views of a flexible body panel affixed to a vehicle frame.

FIGS. 9A-B depict zoomed-in cross-sectional views of a flexible body panel affixed to a vehicle frame. Included in the figures is the vehicle frame 900, the flexible body panel 901, a flexible body panel shape 901a, an exposed unibody panel 902, a removable-panel securing fixture 903, and a fastener 904. A bending force 905 in the flexible body panel tends to bow the flexible panel outwards from the vehicle.

The bowing may occur as a result of the fastener being overtightened, as a manufacturing defect in flexible body panel, or as a combination of overtightening and defects. Other factors, such as wear, may lead to bowing. As shown in FIG. 9A, the flexible body panel extends outwards from the vehicle as a result of the bending force, leaving a gap 906 between the flexible body panel and the unibody panel. As shown in FIG. 9B, the unibody panel prevents bowing by the bending force by exerting a counter-force 907 that opposes the bending force. Additionally, the flexible body panel shape may be formed in the body panel to reduce the potential for, and/or effects of, overtightening of the fastener. As shown, the shape is flat and indented, as opposed to rounded like the other surfaces of the flexible body panel, to be complementary with the securing fixture.

Figures 10A, 10B:
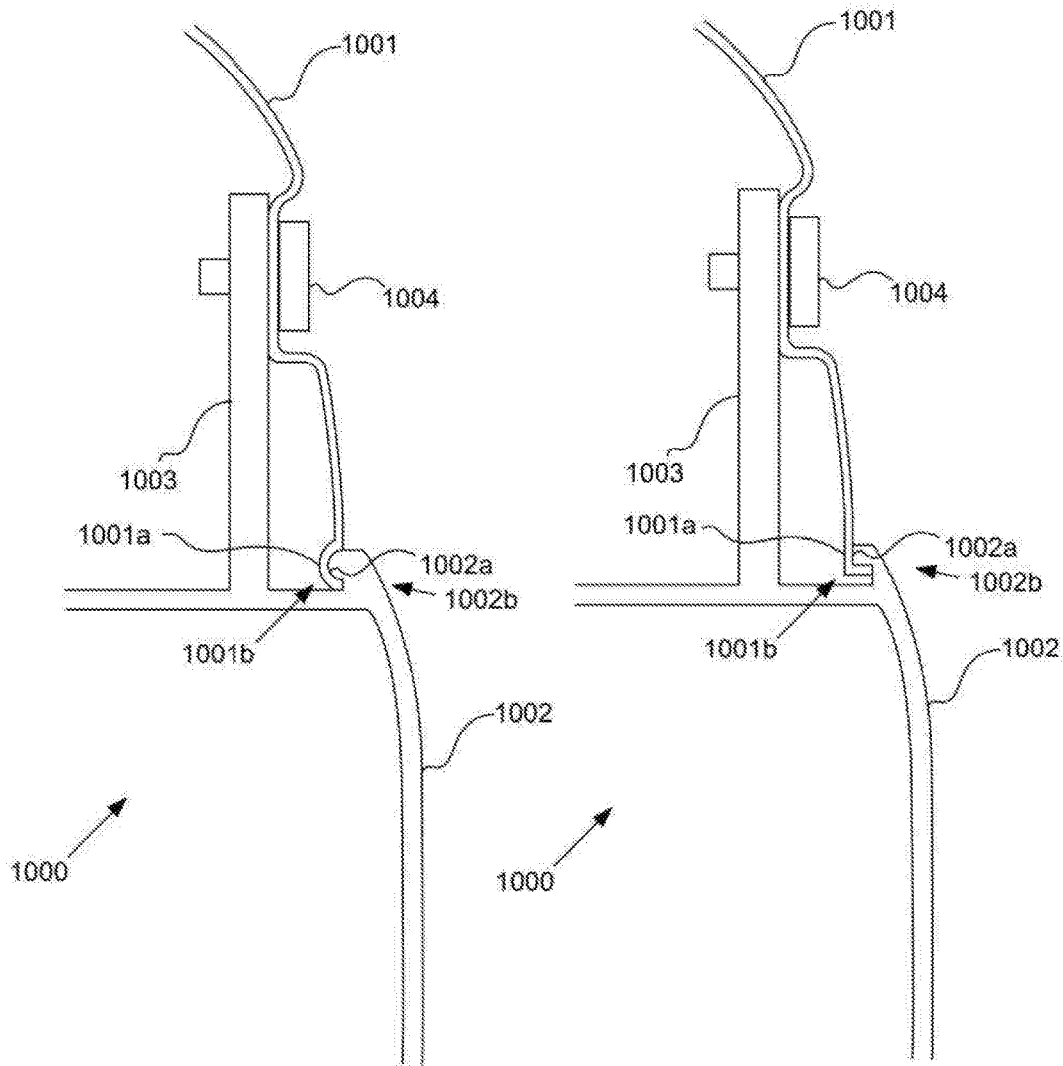
FIGS. 10A-E depict additional zoomed-in cross-sectional views of a flexible body panel affixed to a frame, including complementary shapes between the body panel and the frame.
Figure 10C:
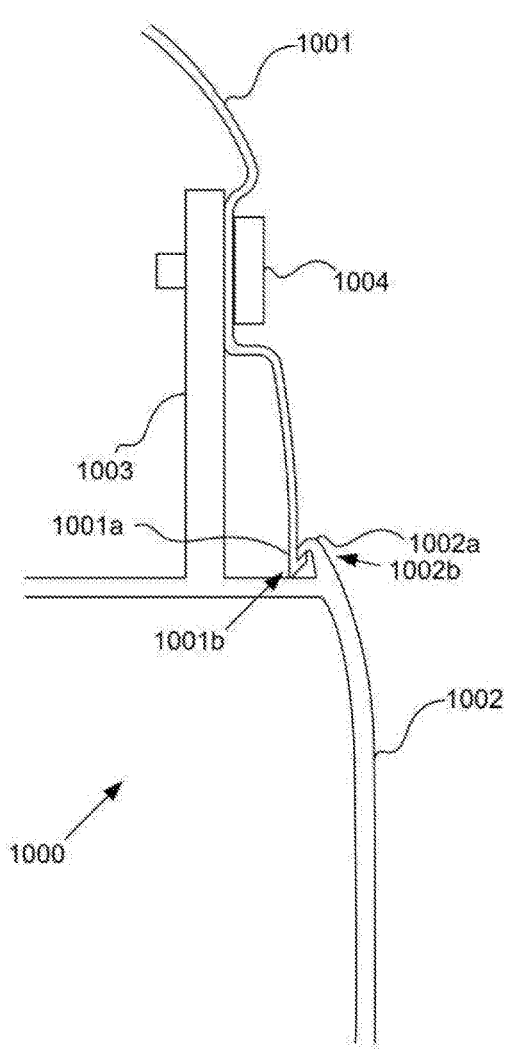
Figure 10D:
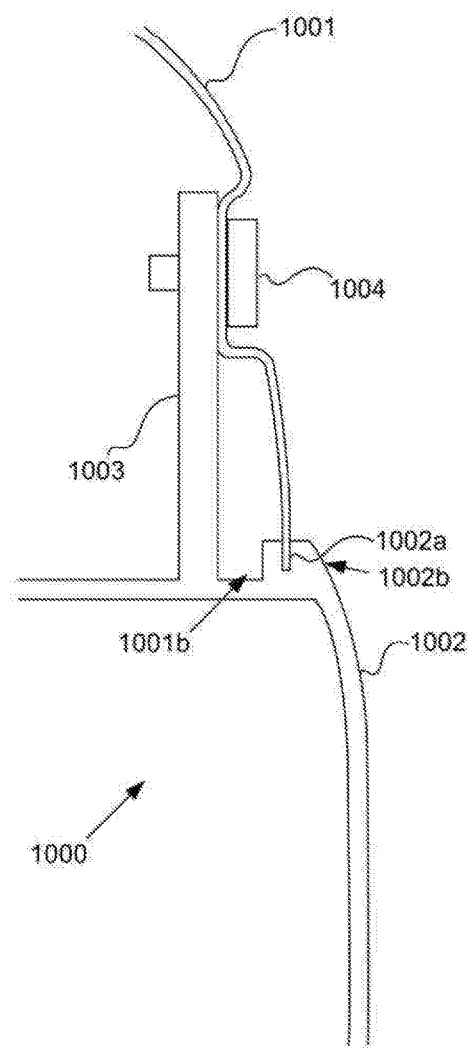
Figure 10E:
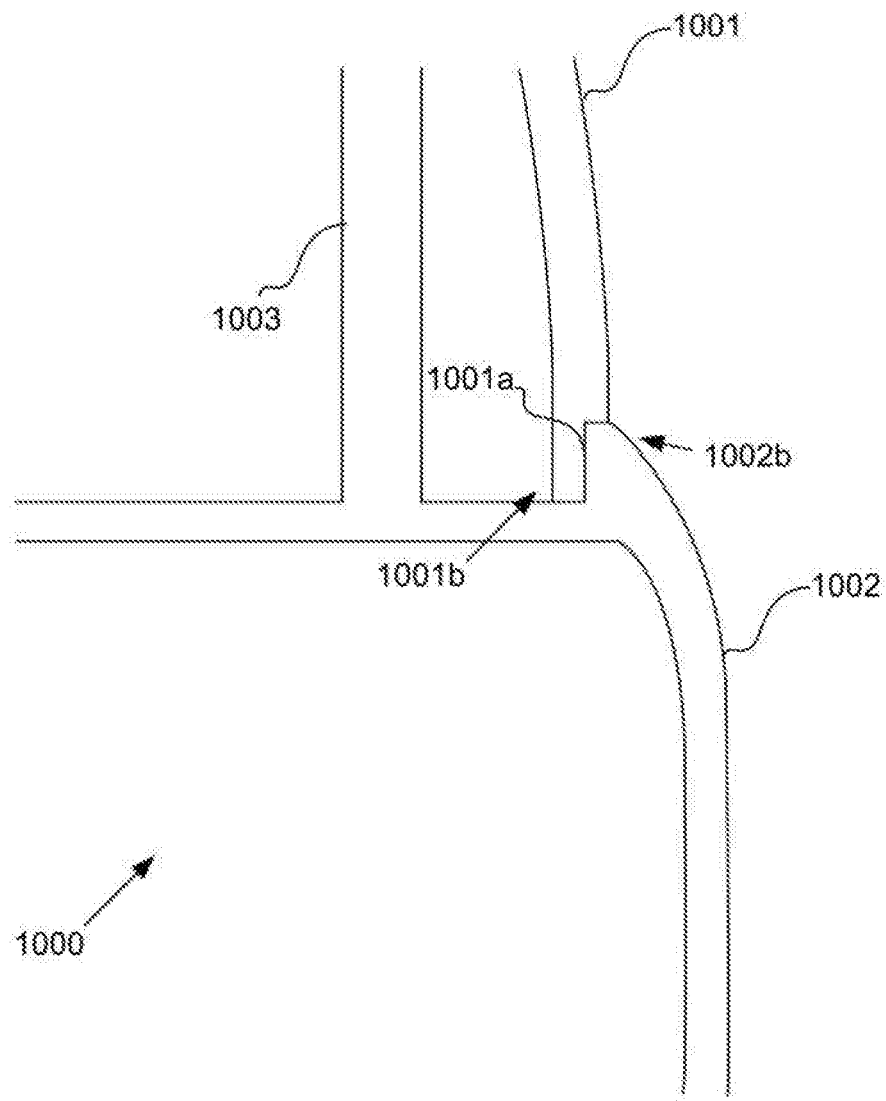

FIGS. 10A-E depict additional zoomed-in cross-sectional views of a flexible body panel affixed to a frame, including complementary shapes between the body panel and the frame. Included in the figures is the vehicle frame 1000, the flexible body panel 1001, a flexible body panel shape 1001a, a flexible body panel outside edge 1001b, an exposed unibody panel 1002, an unibody panel shape 1002a, an unibody panel edge 1002b, a removable-panel securing fixture 1003, and a fastener 1004. Similar to that depicted in, and described above regarding, FIG. 9B, a bending force in the flexible body panel forces the flexible body panel shape against the unibody panel shape. The unibody panel shape exerts a counter-force against the body panel shape that opposes the bending force. The body panel shape and unibody panel shape are complementary, such that the panels fit together. The shapes are formed in the respective edges of the body panel and the unibody panel. In FIG. 10A, the complementary shapes are curves; in FIG. 10B, the complementary shapes include right-angles; in FIG. 10C, the complementary shapes are hooks; in FIG. 10D the unibody panel shape is a slot and the body panel outside edge sits in the slot; in FIG. 10E the body panel outside edge is indented and fits around the unibody panel edge.

Figure 11:
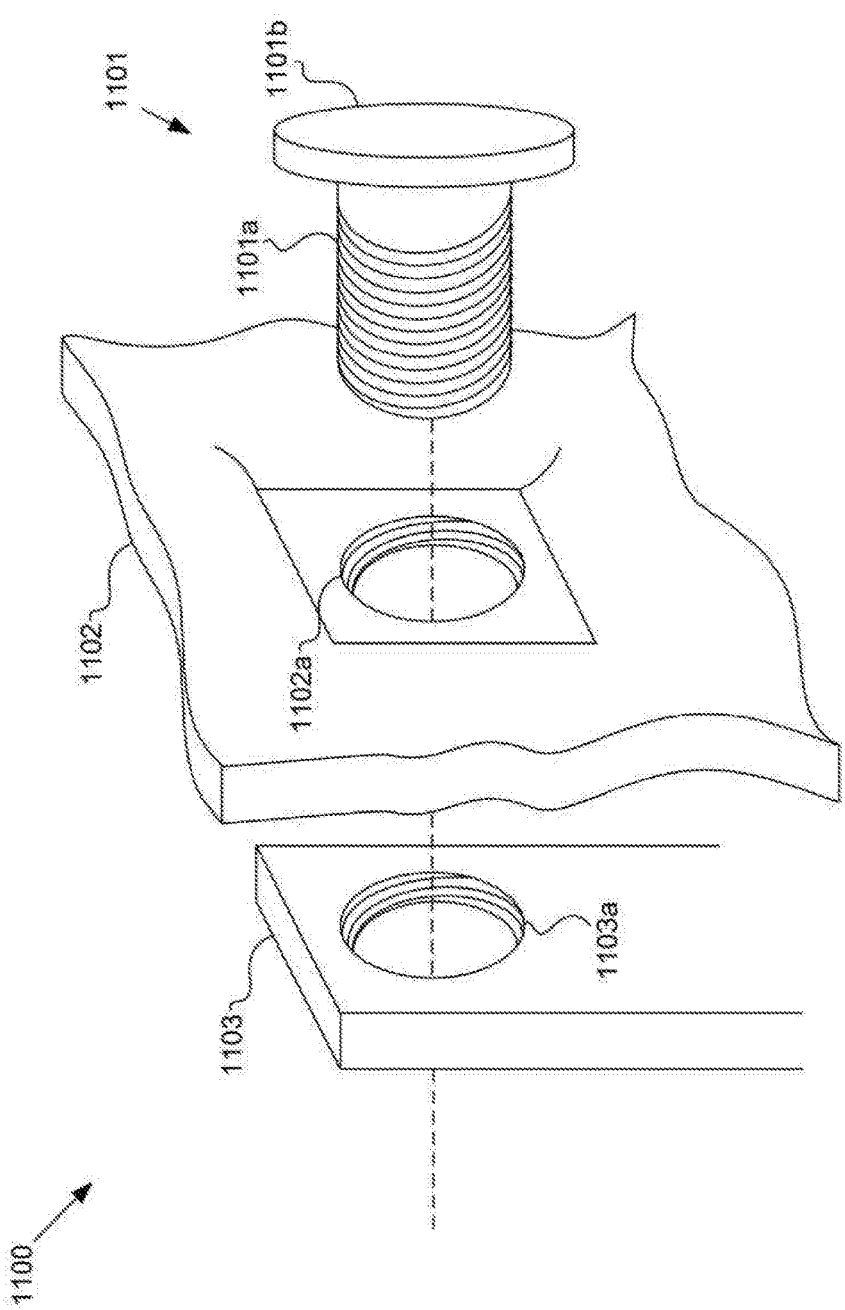
FIG. 11 depicts a zoomed-in isometric view of one embodiment of a securing fixture and fastener.

FIG. 11 depicts a zoomed-in isometric view of one embodiment of a securing fixture and fastener. Included are the fastener 1101, a fastener rod 1101a, a fastener head 1101b, a flexible body panel 1102, a body panel opening 1102a, the removable-panel securing fixture 1103, and a securing fixture opening 1103a. The rod and openings are correspondingly threaded. The rod may pass through the openings by aligning the threading of the rod and openings. Thereby, the body panel may be pinned between the head and the securing fixture.

FIGS. 12A-F depict various side views of one embodiment of a fastener. The fastener 1200 includes a head 1201, a rod 1202, spring-loaded detents 1203, and a twist-knob 1204. In FIG. 12A, a flexible body panel 1205 is pinned between the detents and a removable-panel securing fixture 1206. FIG. 12B is a view of the fastener in the same position as in FIG. 12A, rotated by ninety degrees. In FIG. 12C, the twist-knob is pressed into the head, which draws the detents into the rod. FIG. 12D is a view of the fastener in the same position as in FIG. 12C, rotated by ninety degrees. In FIG. 12E, the twist knob is twisted to lock the detents within the rod, and the fastener is slightly removed from the body panel and securing fixture. FIG. 12F is a view of the fastener in the same position as in FIG. 12E, rotated by ninety degrees.

Figure 13A:
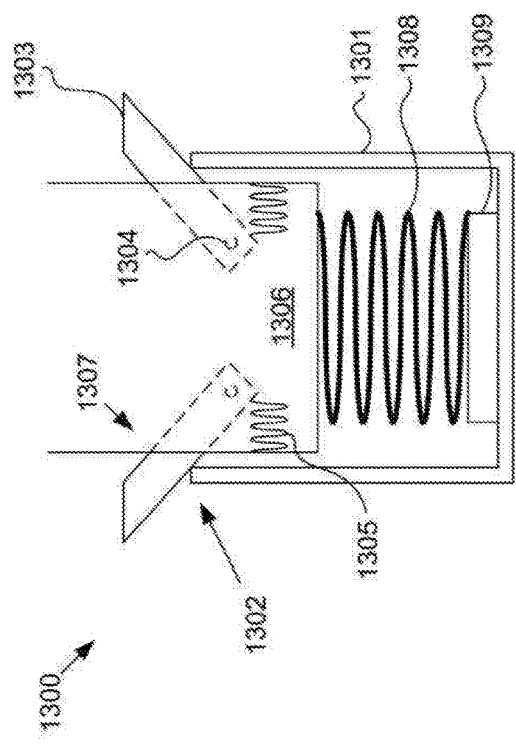
FIGS. 13A-C depict three cross-sectional views of a fastener rod.
Figure 13C:
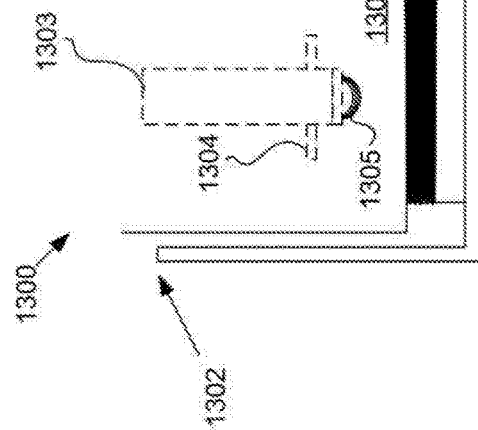
Figure 13B:
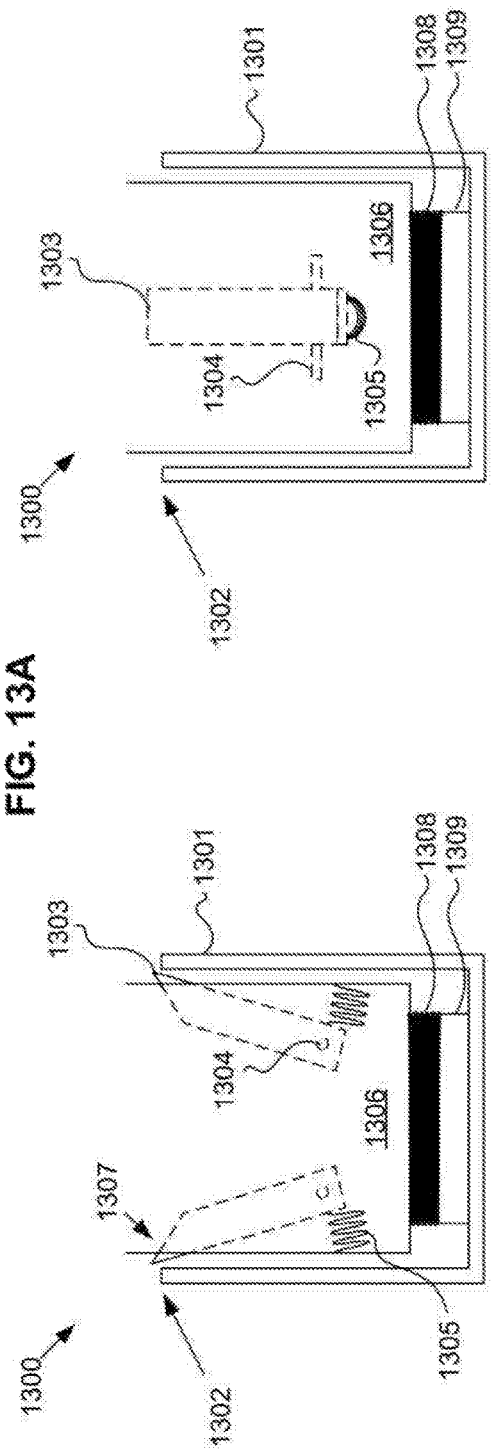

FIGS. 13A-C depict three cross-sectional views of a fastener rod. The rod 1300 includes a rod housing 1301, rod housing openings 1302, detents 1303, detent pivots 1304, detent springs 1305, a twist knob body 1306, twist knob openings 1307, a twist knob spring 1308, and a rotatable base 1309. The detents are fixed within the twist knob body by the pivots, and pass through the twist knob openings and the rod housing openings to fix a body panel to a securing fixture. The detent springs press on the detents about the pivots, forcing the pivots through the openings as the twist knob spring is in an extended equilibrium, as shown in FIG. 13A. As shown in FIG. 13B, as the twist knob spring is compressed, the detents are forced by the rod housing into the twist knob housing, compressing the detent springs. FIG. 13C depicts a view of the knob twisted ninety degrees so that the detents are moved away from the rod housing openings and within the rod housing. The rotatable base allows for rotation of the twist knob housing and twist knob spring within the rod housing. This fixes the detents within the rod housing, which may allow a user to remove the rod from fastening a body panel to a securing fixture.

We claim:

1. A three-wheeled automobile, comprising
a unibody frame, comprising:
    an exposed unibody panel; and
    one or more removable-panel securing fixtures disposed adjacent to the exposed unibody panel;
a flexible engine cowling panel secured to at least one of the one or more securing fixtures; and
one or more fasteners passing through the engine cowling panel and affixed to at least one of the one or more securing fixtures,
wherein the engine cowling panel passes over the one or more securing fixtures and behind the unibody panel,
wherein an outside edge of the engine cowling panel is pressed against the unibody panel outwards from the automobile by a bending force in the engine cowling panel, and
wherein the unibody panel prevents bowing of the outside edge by exerting a counter force to the bending force on the outside edge.

2. The automobile of claim 1, wherein the unibody panel and the flexible engine cowling panel form an engine cowling surrounding an engine compartment.

3. The automobile of claim 1, further comprising a shape formed in the flexible engine cowling panel that is complementary to a shape of at least one of the one or more securing fixtures.

4. The automobile of claim 1, wherein at least one of the one or more securing fixtures comprises an opening, and wherein at least one of the one or more fasteners comprises a spring-loaded detent, wherein the detent passes through the engine cowling panel and the opening and pins the engine cowling panel between the securing fixture and the fastener.

5. The automobile of claim 1, wherein at least one of the one or more securing fixtures comprises an opening, and wherein at least one of the one or more fasteners comprises a spring-loaded detent, wherein the detent passes through the engine cowling panel and the opening and pins the engine cowling panel between the securing fixture and the fastener, and wherein the detent retracts into the fastener and rotates within the fastener to prevent the detent from engaging the securing fixture.

6. The automobile of claim 1, wherein the unibody panel comprises a shape complementary to an engine cowling panel shape, and wherein the complementary shapes are disposed adjacent to each other and forced against each other by the bending force in the engine cowling panel.

7. The automobile of claim 1, wherein the unibody panel comprises a hook shape complementary to an engine cowling panel hook shape, and wherein the complementary hook shapes are disposed adjacent to each other and forced against each other by the bending force in the engine cowling panel.

8. The automobile of claim 1, wherein the unibody panel comprises a curved shape complementary to an engine cowling panel curved shape, and wherein the complementary curved shapes are disposed adjacent to each other and forced against each other by the bending force in the engine cowling panel.

9. The automobile of claim 1, wherein the unibody panel comprises a right-angle shape complementary to an engine cowling panel right-angle shape, and wherein the complementary right-angle shapes are disposed adjacent to each other and forced against each other by the bending force in the engine cowling panel.

10. The automobile of claim 1, wherein the unibody panel comprises a slot, and wherein the outside edge of the engine cowling panel sits in the slot.

11. The automobile of claim 1, wherein at least one of the one or more securing fixtures comprises a standoff extended from the unibody frame.

12. The automobile of claim 1, wherein at least one of the one or more securing fixtures comprises a threaded opening, and wherein at least one the one or more fasteners comprises a threaded rod, the threads corresponding to the threaded opening.

13. The automobile of claim 1, wherein the outside edge of the engine cowling panel comprises an indentation corresponding to an edge of the unibody panel.

14. The automobile of claim 1, wherein the unibody panel extends across a front of the automobile, along a side of the automobile, across a back of the automobile, across a top side of the automobile, or combinations thereof.

15. The automobile of claim 1, wherein the unibody panel extends across a top side of the automobile between a passenger compartment and an engine compartment.

16. The automobile of claim 1, wherein the unibody frame comprises aluminum, carbon, steel, or combinations thereof.

17. The automobile of claim 1, wherein the engine cowling panel comprises a thermoplastic.

18. The automobile of claim 1, wherein the engine cowling panel comprises ABS plastic.

19. The automobile of claim 1, further comprising a flexible body panel disposed along a side of the unibody panel opposite the engine cowling panel.

20. The automobile of claim 1, wherein the unibody panel extends from two sides of a wheel well of the automobile.

* * * * *